Jan. 4, 1966
C. R. WOOLUMS
3,226,875
FISH LURES
Filed April 26, 1961
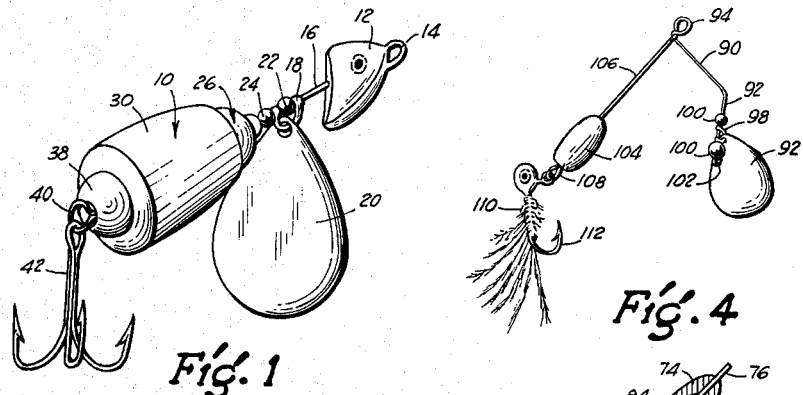
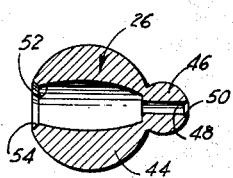
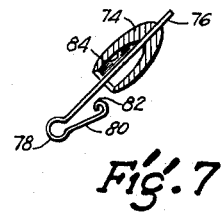
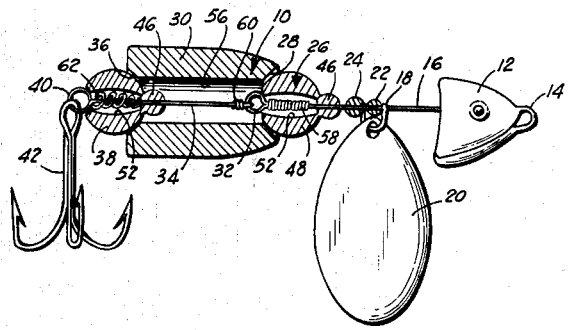
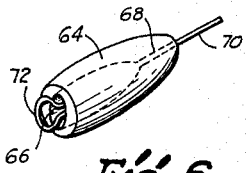
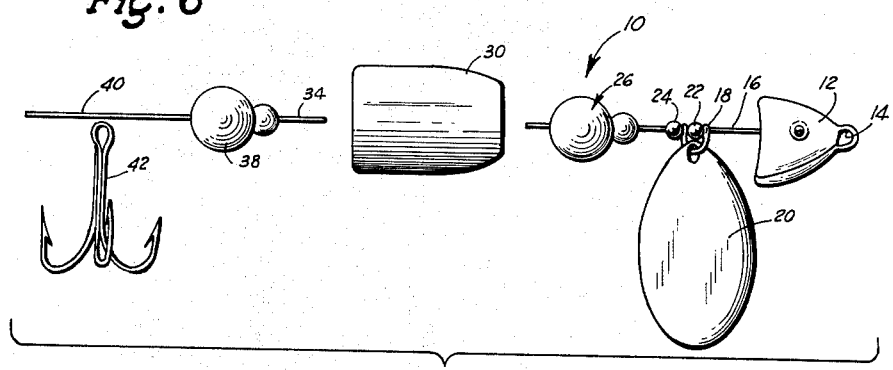
INVENTOR.
Charles R. Woolums
BY
C. M. McKnight
ATTORNEY _United States Patent Office_

3,226,875
Patented Jan. 4, 1966

3,226,875
FISH LURES
Charles R. Woolums, Grove, Okla., assignor of one-half to Virgil M. Boswell, Grove, Okla.
Filed Apr. 26, 1961, Ser. No. 105,725
3 Claims. (Cl. 43—42.17)

This invention relates to improvements in fishing devices and more particularly, but not by way of limitation, to a novel artificial bait or fish lure of the spinner type.

There are many types and styles of fish lures available today, and with the increased popularity of the fishing sport, there is an ever increasing demand for different and more effective lures. The present invention contemplates a novel fish lure of the spinner type particularly designed and constructed to facilitate the catching of fish through the use of artificial bait. The novel fish lure is provided with a friction body member adapted for disposition on the shaft of a spinner to provide a multiplicity of functions. The friction body secures the wire shaft of a lure to substantially any type lure body and conceals the mechanical connections of the lure, thus increasing the effectiveness of the lure, and simultaneously provides a unique body action, particularly in utilization with certain types of lures, such as a bass lure for muddy water conditions, or the like. The particular design and utilization of the friction body also facilitates the assembly or construction of the lure, and is preferably of an outer conformation or configuration and coloring for particularly attracting a fish.

It is an important object of this invention to provide a novel fish lure particularly designed and constructed to more effectively lure a fish.

It is another object of this invention to provide a novel fish lure of the spinner type wherein the mechanical connections thereof are effectively concealed for increasing the efficiency of the results.

Another object of this invention is to provide a novel fish lure having a unique body action for increasing the attracting qualities of the lure.

Still another object of this invention is to provide a novel friction body for a fish lure which is adapted to a great variety of types of lures for enhancing the luring performances thereof.

It is a further object of this invention to provide a novel friction body for a fish lure wherein the assembly of the lure is greatly facilitated.

And a still further object of this invention is to provide a novel fish lure which is simple and efficient in operation and economical and durable in construction.

Other objects and advantages of the invention will be evident from the following detailed description, read in conjunction with the accompanying drawings, which illustrate my invention.

In the drawings:

FIGURE 1 is a perspective view of a fish lure embodying the invention.

FIGURE 2 is a sectional elevational view of the fish lure depicted in FIG. 1.

FIGURE 3 is an exploded elevational view of the fish lure depicted in FIG. 1.

FIGURE 4 is an elevational view of another fish lure embodying the invention.

FIGURE 5 is an enlarged sectional elevational view of a frictional body such as may be utilized with the invention.

FIGURE 6 is a perspective view of a modified frictional body.

FIGURE 7 is a sectional elevational view of a modified type of connection member.

Referring to the drawings in detail, and particularly FIGS. 1, 2 and 3, reference character 10 generally indicates a fish lure of the bass type especially under muddy water conditions. However, it is to be understood that the invention is not limited to any particular type of lure, and those depicted herein are merely illustrative of the invention. The lure 10 comprises a weighted head member 12 of a configuration generally simulating the head of a fish, and provided with an aperture or eye 14 at one end thereof for securing the head to a fish line, or the like (not shown) in the usual manner. The head member 12 is provided with an outwardly extending shaft member 16 having a substantially U-shaped clevis 18 slidably disposed thereon and rotatable thereabout. A suitable spinner member 20, such as a spoon type, is carried by the clevis 18 as is well known, and functions or operates in the usual manner. An assembling bead 22 is preferably disposed on the shaft 16 between the spaced ends of the clevis 18, and a second assembling or end thrust bead 24 is disposed on the shaft 16 opposite from the head member 12 with respect to the clevis 18.

A friction sleeve 26 is slidably disposed on the shaft 16, and is retained thereon by friction, as will be hereinafter set forth in detail. In the fully assembled lure 10 as depicted in FIGS. 1 and 2, the friction sleeve 26 seats in a socket or counterbore recess 28 of a body member 30. The shaft 16 extends through the friction sleeve 26 and is provided with an aperture or eye 32 at the outer extremity thereof for receiving a second shaft member 34. The body 30 is loosely disposed on the connected shafts 16 and 34, as clearly shown in FIG. 2, and is provided with a detent or counterbore recess 36 similar to and oppositely disposed from the recess 28 for receiving a second friction sleeve 38. The sleeve 38 is slidably disposed on the shaft 34 and retained thereon by friction, as will be hereinafter set forth. The shaft 34 is provided with a suitable aperture or eye 40 on the exposed end thereof for receiving any well known type of fish hook 42. The fish hook 42 is loosely carried by the eye member 40 whereby there is substantially complete freedom of movement for the hook, but of course, there is relatively little danger of accidentally losing the hook from the connection with the eye member 40, as is well known.

The friction sleeves 26 and 38 are preferably identical and while only the description of the sleeve 26 is set out herein, it is to be understood that the sleeve 38 is of substantially the same construction. The sleeve 26, particularly shown in detail in FIG. 5, may be constructed of any suitable resilient plastic and may be of substantially any style outer configuration in accordance with the type of lure desired. The sleeve depicted in FIGS. 1, 2, 3 and 5 is provided with an outer configuration assimilating a bead or ball, but it is to be understood that the invention is in no manner limited to such an outer countenance. The sleeve 26 herein comprises a substantially spherical main body portion 44 having a substantially smaller spherical portion 46 integral therewith. A longitudinally extending central bore 48 extends through the reduced portion 46 and into the main body portion 44. The bore 48 is flared or counterbored at the open end 50 thereof and the opposite end extends into communication with an enlarged bore 52 which is similarly flared or counterbored at the open end 54 thereof.

Although the periphery or side walls of the bore 50 may be straight, if desired, it is preferable that the bore be slightly arcuate in configuration. It has been found that the arcuate structure of the bore functions to lock the connection members between the shafts and the respective eye members securely in plate when the lure 10 is assembled, as will be hereinafter set forth.

The diameter of the bore 48 is preferably slightly less than the outer diameter of the shaft 16 and the largest diameter of the flared portion or counterbore 50 is preferably substantially equal to the outer diameter of the shaft 16. Thus, upon assembly of the lure 10, the shaft 16 may be inserted into the flared portion 50, and forced through the bore 48. The resilient qualities of the plastic sleeve 26 facilitates the insertion of the shaft 16 through the bore 48, and provides a firm grip on the outer periphery thereof for retaining the sleeve 26 on the shaft 16 at substantially any desired position by friction. It will be apparent, however, that manual pressure may be exerted on the sleeve 26 for longitudinal movement thereof along the shaft 16, but the frictional engagement between the bore 48 and the shaft 16 securely retains the sleeve 26 in any position thereon, as desired.

The body 30 may be constructed of any suitable material, such as a plastic, wood, or the like, but not limited thereto, and is provided with a longitudinal internal bore 56 (FIG. 2) extending between the oppositely disposed recesses 28 and 36. The diameter of the bore 56 is substantially larger than the shafts 16 and 34, eye member 32, and the ball portion 46 disposed therein in order to provide for freedom of movement for the body 30 when the lure 10 is in use. The recesses 28 and 36 and the sleeve members 26 and 38 provide a substantially ball and socket type connection and the hinge-like connection between the shafts 16 and 34 cooperates therewith whereby the entire lure 10 is of a flexible type action as will be hereinafter set forth.

METHOD OF ASSEMBLY

Referring now to FIG. 3, the lure 10 may be assembled in a facile manner to provide a fish lure of substantially increased efficiency in results. The spinner member 20 may be readily secured to the straight shaft 16 by the clevis 18 in the well known manner prior to the forming of the eye member 32 on the outer end of the shaft 16. The bead 22 may be disposed on the shaft 16 simultaneously with the clevis 18, and the bead 24 may then be disposed on the shaft, as shown in the drawings. The shaft 16, being straight and without the eye member 32, may then be inserted into the bore 48 of the friction sleeve 26, as hereinbefore set forth, and the friction sleeve 26 may be manually moved along the shaft 16 to a position substantially close to the head member 12 with the clevis 18 and beads 22 and 24 interposed therebetween. This provides a maximum clearance between the sleeve 26 and the outer extremity of the shaft 16 for facilitating the forming of the eye 32.

The eye 32 may be formed in any suitable manner, such as by bending the shaft 16 back over itself and winding the bent portion thereof around the adjacent straight portion to provide a connection as shown at 58 in FIG. 2. While this type of connection may be preferable, it is to be understood that there are many methods of forming the eye 32, and any suitable method may be utilized, such as that shown in FIG. 7, to be hereinafter set forth in detail.

Prior to the forming of the eye 40 on the second shaft 34, the shaft 34 may be secured to the eye 32 in any well known manner, as shown at 60 in FIG. 2, to provide a hinge-like or universal action between the shafts 16 and 34. The body 30 is then slipped onto the connected shafts 16 and 34 and moved substantially adjacent to the sleeve 26 to provide maximum clearance for the exposed end of the shaft 34. The shaft 34 may then be inserted into the bore 48 of the sleeve 38 as set forth in the assembly of the sleeve 26 on the shaft 16. The sleeve 38 may be manually moved along the shaft 34 to a position adjacent the connection member 60 to provide clearance for facilitating the forming of the eye 40. The eye 40 may then be formed on the exposed end of the shaft 34 in any suitable manner as hereinbefore set forth. It will be apparent that the connection or forming of the eye 40 may be made with relatively few turns of the bent portion of the shaft 34 around the adjacent straight shank thereof, as shown at 62 in FIG. 2, or may be made with several of the turns as depicted in the connection 58.

The hook 42 may now be attached or secured to the eye 40 in the usual manner, as is well known. The sleeve 38 may then be manually moved along the shaft 34 to a position adjacent the eye 40. It is preferable that the plane of the eye 40 be substantially perpendicular to the plane of the head member 12 for increasing the efficiency of the lure 10 during utilization thereof. The flared portion 54 will seat against the substantially rounded outer configuration of the eye 40 for fitting snugly thereagainst, and the entire connection portion 62 will be encased within the bore 52 of the sleeve 26. It is preferable that the distance between the eyes 32 and 40 be such that the sleeve 26 will be disposed adjacent the eye 32 when the sleeve is disposed in the socket 28.

It will be apparent that the entire looseness or tightness of the relationship between the sleeves 26 and 38 and body 30 may be adjusted by the variable positions at which the sleeves 26 and 38 may be disposed on the respective shafts 16 and 34. The frictional engagement between the sleeves 26 and 38 and the respective shafts securely retains the sleeves at any position thereon, but the preferred disposition or assembly is as hereinbefore set forth.

Since the bore 56 is substantially larger than the shafts 16 and 34 extending therethrough, a considerable vibration is picked up from the action of the spinner member 20 when the lure 10 is in the normal use. The flexible connection or structure of the lure 10 due to the ball and socket arrangement between the sleeves 26 and 38 and the body 30, and also due to the flexible connection between the shafts 16 and 34 provides for a considerable movement and rattling effect from the lure 10 which has been found to be particularly effective in the attracting of fish. As hereinbefore set forth, the lure 10 depicted in FIGS. 1, 2 and 3 is a muddy water bass lure, and the vibration and noise created by the lure 10 provides an efficiency of results found to be considerably greater than that possible with the usual muddy water lure available today.

MODIFIED STRUCTURES

FIGURE 6 illustrates a modified structure of a friction sleeve 64 of the invention and is preferably of an elongated rounded configuration, but not limited thereto. A central bore 66 extends longitudinally in the body 64, as shown in dotted lines, and preferably is of a slotted or elongated cross-sectional configuration. The bore 66 extends within the body 64 into communication with a reduced bore 68 of a diameter slightly less than that of the shaft 70 with which the body 64 is to be utilized to provide a frictional engagement therebetween, as set forth in the preferred embodiment. The outer or exposed end (not shown) of the smaller bore 68 may be flared to a size substantially equal to the outer diameter of the shaft 70 to facilitate the insertion of the shaft 70 therein. The eye member 72, formed on the outer end of the shaft 70 in any suitable manner (not shown), fits somewhat snugly in the bore 66, and it will be apparent that the elongated cross-sectional configuration of the bore 66 will function to retain the eye 72 in the desired disposition with regard to the remaining elements of the lure. The outer end of the bore 66 may also be flared, if desired, for receiving the eye 72 thereagainst. It is to be understood that the outer configuration of the friction sleeve or body 64 may be substantially any desired style, and the rounded or elongated spherical configuration depicted herein is merely illustrative of the invention.

FIGURE 7 is a view depicting another means of forming an eye member, and depicts a friction sleeve 74 similar to the sleeve 64 and adapted for disposition on a shaft 76 of the fish lure (not shown) to be utilized. The outer extremity of the shaft 76 is formed with a rounded portion or an eye member 78 and an outer extremity or leg member 80 extending therefrom. The free end 82 of the leg member 80 may be in the form of a hook and may be snapped around the straight portion of the shaft 76. The hook 82 is depicted in the open position in FIG. 7 to illustrate how the fish hook (not shown) may be readily attached to the eye member 78. This type of construction for the eye member 78 may be desirable in many types of fish lures. After the eye 78 is formed and the hook 82 is secured around the shaft 76, the friction sleeve 74 may be moved on the shaft 76 into a position adjacent the eye 78 whereby the leg member 80 and the hook connection member 82 will be concealed by the sleeve 74, as set forth in the preferred embodiment. The central bore 84 of the body 74 may be either of the elongated cross-sectional configuration as provided in the body 64 shown in FIG. 6, or may be of a substantially circular cross-sectional configuration, as desired. However, it is preferable that the side walls or periphery of the bore 84 be slightly arcuate, as set out in the preferred embodiment, for securely retaining the eye member 78 and connection therewith to the shaft 76 in position within the bore 84.

Referring to FIG. 4, another type of fish lure 90 is illustrated wherein a spinner shaft 92 is formed with a plurality of angularly disposed portions and provided with an eye member 94 at the juncture of two of said angularly disposed portions whereby the lure 90 may be secured to a fish line (not shown). A suitable spinner 96 is secured to the shaft 92 by the usual clevis member 98, and a pair of oppositely disposed thrust beads 100 flank the clevis member 98. The outer end 102 of the shaft 92 may be bent or otherwise enlarged to retain the beads 100 and clevis member 98 on the shaft 92, as is well known. A friction sleeve 104 is provided on the straight portion 106 of the shaft 92 and fits snugly against an eye member 108 formed on the outer end of the straight shaft section 106. The friction sleeve 104 shown in FIG. 4 is of a slightly different outer configuration than the friction sleeves set out herinbefore, but the internal construction thereof is substantially identical therewith. The sleeve 104 encases the connection portion (not shown) between the eye 108 and the straight shank 106 as set forth in the preferred embodiment.

Any suitable lure body, such as the feather member 110, may be secured to the eye 108 in the usual manner. In the present instance, the member 110 generally simulates an insect, or the like, and embodies a hook 112 which is substantially concealed by the feather construction of the member 110. It will be readily apparent that the friction sleeve may be carried by a variety of different types of wire shafts for facilitating securing of the shafts to a lure body of any desired type.

From the foregoing, it will be apparent that the present invention provides a novel fish lure wherein the particular design and construction thereof provides for a tremendous vibration and noise during the normal utilization thereof. The preferred embodiment of the invention is especially effective when utilized as a muddy water bass lure. The adjustable friction sleeve members of the invention may be used to attach substantially any wire shaft to any desired lure body, and may be of a variety of outer configurations. Thus, the friction sleeve not only facilitates the assembly or construction of a fish lure, but functions as an ornamental or attracting portion for the lure. The novel fish lure and method of assembly thereof is simple and effective in operation and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

What is claimed is:

1. A fish lure comprising a weighted head member, a shaft secured to the head member, spinner means journalled on the shaft, a second shaft flexibly secured to the first shaft, a lure body loosely disposed about the connected shafts, friction sleeve means adjustably disposed on the shafts at each end of the lure body and cooperating therewith to support the same to provide a rattling and vibrating action for the fish lure, and hook means carried by the second shaft.

2. A fish lure comprising a weighted head member, a shaft extending from the head member, spinner means journalled on the shaft, a second shaft flexibly secured to the first shaft, a lure body loosely disposed about the connected shafts, spaced friction members slidably disposed on the shafts at each end of the lure body and cooperating therewith to support the same to provide a vibrating and rattling action for the fish lure, said friction members provided with internal bores of a diameter slightly less than the diameter of the shafts to provide a frictional engagement therebetween, and hook means carried by the second shaft.

3. In a fish lure, a first shaft, a lure body loosely disposed about said first shaft, a second shaft hingedly connected to one end of the first shaft, hook means hingedly connected to the opposite end of the first shaft, a first friction sleeve disposed on the second shaft and encasing a portion of the hinged connection between the first and second shafts, a second friction sleeve disposed on the first shaft and encasing a portion of the hinged connection between the hook means and first shaft, said friction sleeve engageable with the opposite ends of the lure body to provide a ball and socket connection therebetween for permitting a rattling and vibration action for the fish lure, a weighted head member simulating the head of a fish secured to the second shaft and spaced from the first friction sleeve, and a spinner member journalled on the second shaft between the weighted head member and the first friction sleeve.

References Cited by the Examiner

UNITED STATES PATENTS

| 1,033,281 | 7/1912 | Skvor et al. | 43—42.44 X |
|-----------|--------|--------------|------------|
| 2,275,253 | 3/1942 | Eger | 43—42.53 |
| 2,494,407 | 1/1950 | Rhodes | 43—42.05 |
| 2,544,265 | 3/1951 | Kelly et al. | 43—42.53 |
| 2,750,702 | 6/1956 | Hartig | 43—42.17 |
| 2,825,172 | 3/1958 | Bohley | 43—42.16 |

FOREIGN PATENTS 467,809   9/1950   Canada.

ABRAHAM G. STONE, *Primary Examiner.*